Feb. 18, 1947. H. J. BRAUN 2,416,152
RECTIFIER ASSEMBLY
Filed Aug. 11, 1943 2 Sheets-Sheet 1
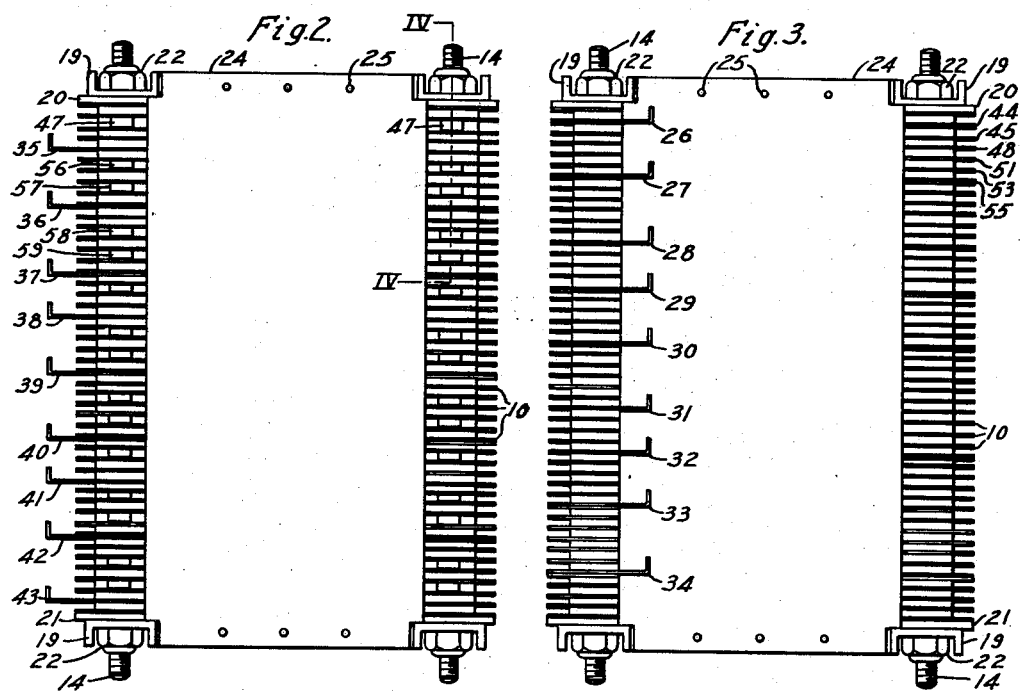
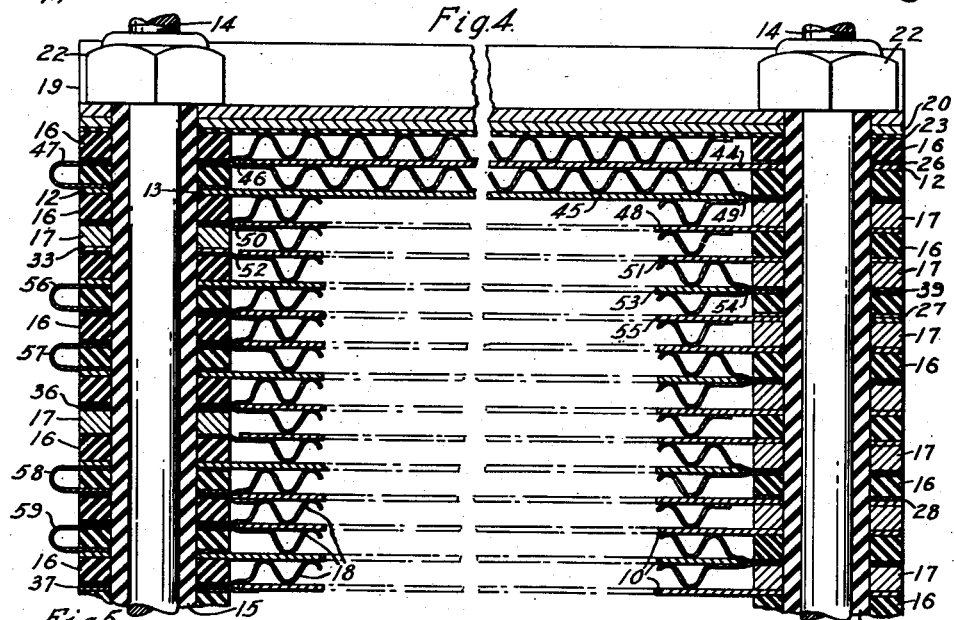
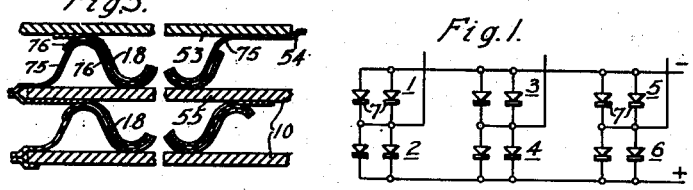
INVENTOR
Herman J. Braun.
BY O. B. Buchanan
ATTORNEY Feb. 18, 1947.    H. J. BRAUN    2,416,152
RECTIFIER ASSEMBLY
Filed Aug. 11, 1943    2 Sheets-Sheet 2
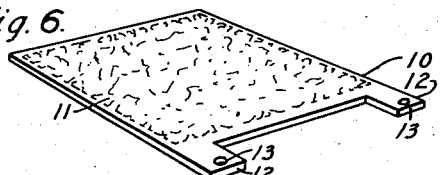
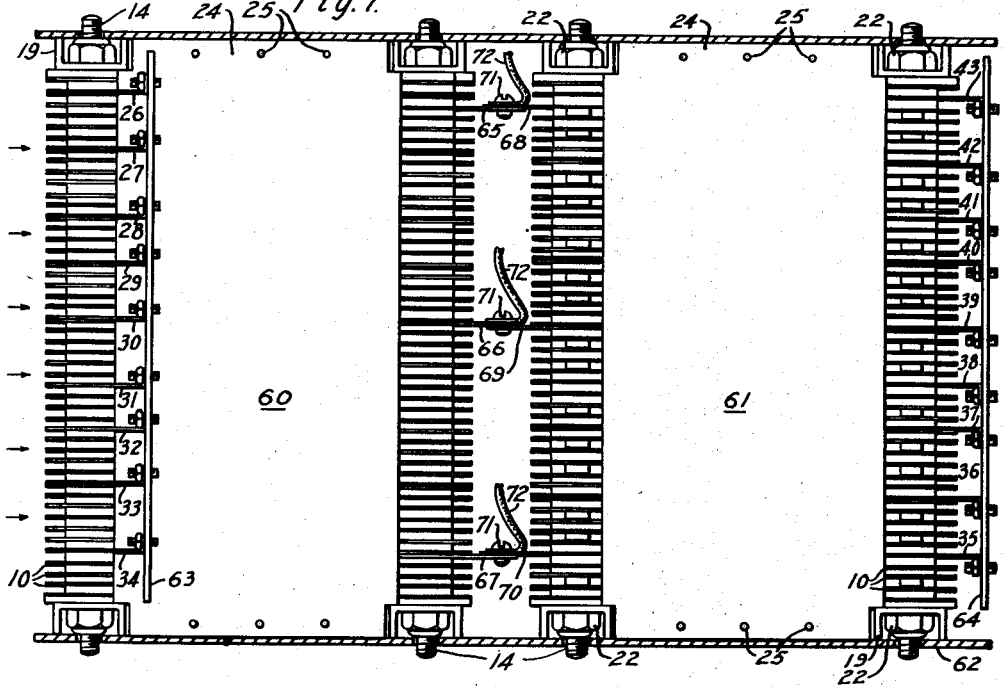
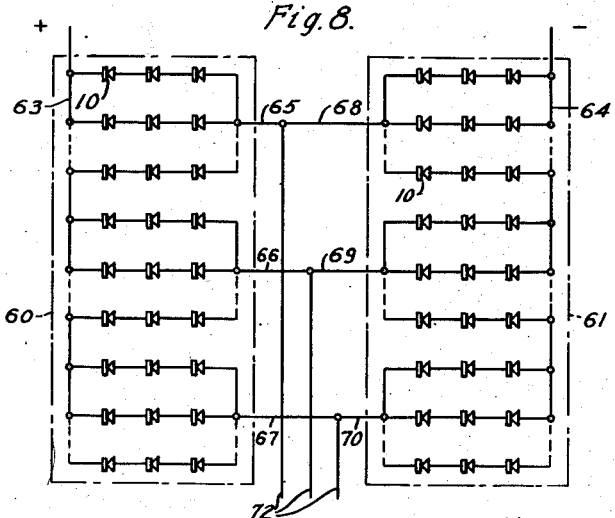
WITNESSES:
INVENTOR
Herman J. Braun.
BY
ATTORNEY Patented Feb. 18, 1947

2,416,152

UNITED STATES PATENT OFFICE 2,416,152

RECTIFIER ASSEMBLY

Herman J. Braun, Lima, Ohio, ass'gnor to Westinghouse Electric Corporation, East Pittsburgh, Pa., a corporation of Pennsylvania Application August 11, 1943, Serial No. 498,196

5 Claims. (Cl. 175—366)

The present invention relates to rectifiers of the contact or dry plate type, such as copper-oxide or selenium rectifiers, and more particularly to a dry plate rectifier assembly which is especially adapted for use on aircraft.

The rectifier assembly of the present invention is especially intended for use in supplying the direct-current electrical load on an airplane from an alternating-current generator driven by the airplane engine, where relatively large output currents are required and forced cooling of the rectifier is used, although its usefulness is not necessarily restricted to this specific application. In the design of rectifiers for use on aircraft, the most important considerations are the weight of the rectifier, which must be kept as small as possible, and the efficiency, which must be as high as possible in order to make the best use of the available space. In order to obtain high efficiency in copper-oxide or selenium rectifiers, the current density in the rectifier plates must be kept fairly low, which means that a relatively large total rectifying area is required.

The rectifying action or asymmetric conductivity of dry rectifier plates occurs only in the contact layer between the copper plate and the copper-oxide coating in the copper-oxide rectifier, or between the selenium and a sprayed contact metal in the selenium rectifier. This layer in which the entire rectifying action occurs is only a few molecules in thickness, and the rest of the plate thickness is necessary only to provide mechanical support for the thin contact layer and electrical connection to it. If plates of large area are used to obtain the low current density required for high efficiency, they must be made relatively thick in order to make them sufficiently rigid mechanically to permit processing of the plates and to provide adequate mechanical support when the plates are assembled in a stack. Large thick plates are undesirably heavy, however, and in order to reduce the weight, the plates can be made extremely thin without sacrifice of any of the electrical characteristics of the rectifier. When the thickness of the plates is reduced, however, their area must also be reduced in order to make them sufficiently rigid mechanically, and a larger number of plates must then be used to obtain the same total rectifying area. Thus, aircraft rectifiers must have relatively small, thin plates in order to keep the weight low, and they must have a relatively large number of plates in order to provide a sufficiently large total rectifying area for the low current density required to obtain high efficiency.

Forced cooling is usually necessary for aircraft rectifiers to obtain the high output required from a rectifier of relatively small size, and a stream of cooling air is provided by means of a fan, or a blast tube drawing air from the forward motion of the airplane. Both the available space and the volume of cooling air are limited in an airplane, however, and because of these limitations and the large number of rectifier plates required for a rectifier of reasonably large output and high efficiency, the rectifier of the present invention is assembled with the plates in two stacks, which are disposed one behind the other in the stream of cooling air, so that the air passes through the two stacks in series. Thus, the second stack of plates operates in a higher ambient temperature than the first stack, since the air is heated in passing through the first stack.

The operation of a rectifier assembly consisting of two stacks of plates located in regions of different ambient temperatures, however, presents certain difficulties because of the negative temperature-resistance characteristic of copper-oxide and selenium rectifier plates. If parallel-connected elements of the rectifier are located in different stacks, the element which is in the higher ambient temperature will have a lower resistance than the other element and will carry more than its share of the current, so that unequal distribution of the current results, with consequent overheating of parts of the rectifier. Similarly, if different arms of a rectifier bridge circuit are in different ambient temperatures, an objectionable ripple may occur in the output current and voltage because of the difference in resistance of the different pairs of arms which operate in series with each other at different parts of the rectifying cycle. The present invention provides a rectifier assembly which is arranged and connected so as to avoid these difficulties, and which provides satisfactory operation with the rectifier plates assembled in two stacks operating in different ambient temperatures.

The principal object of the invention, therefore, is to provide an aircraft rectifier assembly of the dry plate type having a relatively large number of relatively small rectifier plates, which are disposed in two stacks to fit into the limited space available, and which are assembled and connected so that satisfactory operation of the rectifier is obtained when the two stacks are operated in different ambient temperatures.

Another object of the invention is to provide an aircraft rectifier assembly of the dry plate type adapted for forced cooling, in which the rectifier plates are disposed in two stacks and are connected and arranged so as to give satisfactory operation when cooling air flows successively through the stacks in series so that the second stack is at a different temperature from the first stack.

A further object of the invention is to provide an aircraft rectifier assembly of the dry plate type which is especially adapted for forced cooling, in which the plates are disposed in two stacks with means for causing cooling air to flow through the stacks successively, and in which a simple and compact mechanical construction is utilized for the stacks.

Other objects and advantages of the invention will be apparent from the following detailed description, taken in connection with the accompanying drawings, in which:

Figure 1 is an illustrative diagram showing a typical rectifier circuit,

Fig. 2 is a side view of one stack of rectifier plates, which forms a part of a complete rectifier assembly, Fig. 3 is a side view of a stack of rectifier plates, taken from the opposite side of Fig. 2, Fig. 4 is a transverse, sectional view of the upper part of a rectifier stack, approximately on the line IV—IV of Fig. 2 and on an enlarged scale, Fig. 5 is a fragmentary, enlarged detail view showing the spacers between the rectifier plates, Fig. 6 is a perspective view of a single rectifier plate, Fig. 7 is a side elevation of a complete rectifier assembly embodying the present invention, and Fig. 8 is a schematic wiring diagram showing the electrical connections of the rectifier assembly of Fig. 7.

Fig. 1 shows a typical three-phase rectifier bridge circuit having six arms numbered 1 to 6, inclusive. As shown, each of the arms 1 to 6 consists of two parallel branches with one rectifier unit or plate 7 in each branch. The number of branches in parallel in each arm of the rectifier is, of course, determined by the current to be carried and the area of the plates, and two or more rectifier plates may be connected in series in each branch, as determined by the voltage to be applied to the rectifier.

As previously explained, it is necessary in certain applications, such as rectifiers for use on aircraft, to use a relatively large number of rectifier plates of relatively small size, and in accordance with the present invention, the plates are assembled in two stacks which operate in different ambient temperatures. Certain difficulties in operation of the rectifier may, however, be encountered when this is done with the conventional bridge circuit of Fig. 1, because of the negative temperature-resistance characteristic of copper-oxide or selenium rectifier plates.

If the plates of each stack are connected in a complete bridge circuit, such as that of Fig. 1, and the two stacks are connected in parallel to the external input and output circuits, the rectifier stack which operates at the highest temperature will have the lowest resistance, and will take more than its share of the current. The unequal distribution of the current, of course, will result in increased heating of the stack carrying the greater current, so that the difference in temperature is increased with consequent further unbalancing of the currents in the two stacks. Thus the effect is cumulative and one stack will be badly overloaded, resulting in excessive heating, while the other stack is carrying only a small current. Similarly, if parallel branches of a single arm of the rectifier bridge circuit are placed in different stacks operating at different ambient temperatures, a similar effect occurs and the current divides unequally between the two parallel branches. Thus, satisfactory operation cannot be obtained if parallel-connected elements of the rectifier circuit operate in different ambient temperatures, whether the elements be branches of a single arm, or arms of two paralleled bridge circuits.

If three complete arms of the three-phase rectifier bridge circuit are placed in one stack and the other three arms in the other stack, the operation may also be unsatisfactory. Thus, if three arms such as 1, 2 and 3 are placed in one stack, and arms 4, 5 and 6 in the other stack, an objectionable ripple will occur in the direct-current output current and voltage. This is because of the fact that as the applied alternating voltage goes through its cycle, different pairs of rectifier arms carry current in series with the output leads, and since the resistance of arms 1, 2 and 3 will be different from that of arms 4, 5 and 6, the forward voltage drop through the rectifier differs in different parts of the rectifying cycle, so that a highly objectionable ripple occurs in the direct-current output of the rectifier.

Thus, in assembling a bridge-type rectifier with the rectifier plates arranged in two stacks which are cooled by a stream of air passing successively through the stacks in series, satisfactory operation cannot be obtained merely by paralleling the two stacks, or even by placing complete arms of the rectifier in different stacks, unless they are properly chosen. In accordance with the present invention, the difficulties discussed above are avoided by placing all of the rectifier arms which are connected between an alternating-current input lead and a direct-current output lead of one polarity in one stack of the rectifier assembly, and placing all of the arms which are connected between an alternating-current input lead and a direct-current output lead of the opposite polarity in the second stack.

Referring to Fig. 1, if the rectifier plates comprising the arms 1, 3 and 5 are placed in one stack and the plates comprising the arms 2, 4 and 6 in a second stack, satisfactory operation of the rectifier is obtained even though the two stacks operate at different ambient temperatures, and the difficulties discussed above are avoided. All parallel-connected elements of the rectifier, such as the parallel branches of each arm, operate at the same temperature so that the current divides equally between them. There is no objectionable ripple in the output current, since at any point in the rectifying cycle an arm in one stack of the rectifier is operating in series with an arm in the other stack, so that the resultant forward voltage drop is constant throughout the rectifying cycle, and no ripple other than the fundamental ripple occurs in the output current and voltage. Thus, this arrangement of the rectifier makes it possible to dispose the plates in two stacks and cool them by a stream of air passing successively through the two stacks, and in this way, a rectifier can be designed which is especially adapted to the requirements described above for aircraft rectifiers. In other words, a large number of relatively small, thin plates can be used to obtain light weight and high efficiency, and they can readily be arranged to meet the limitations as to space and volume of cooling air.

A preferred construction embodying the invention is shown on the drawing, although it will be understood that other mechanical structures might also be used. The rectifier assembly shown in Figs. 2 through 8 consists of a plurality of rectifier plates 10. These plates are copper plates having a coating 11 of copper-oxide, or other material which will give asymmetric conductivity with the copper plate, on each side of the plate covering substantially its entire area except a narrow strip around the edge, and having extending tabs 12 of bare copper at one end of the plate. Holes 13 are provided in the tabs 12 to facilitate the assembly of the plates in a stack. The plates 10 are made as thin as possible in order to keep their weight low, and they must, therefore, be relatively small to have sufficient mechanical rigidity. Thus, in one actual embodiment of the invention, the plates 10 are approximately 0.015 inch thick, and are 4 inches long, exclusive of the tabs 12, by 4⅓ inches wide. These dimensions, of course, are only illustrative of the size of plates that may be used, and are not to be understood as limiting the invention. Oxide coatings 11 are provided on both sides of the plate 10, and it will be apparent that when an electrical connection is made to the coatings 11 on both sides of the plate, and another electrical connection is made to the copper tabs 12, the plate will function as a rectifying element or cell having two asymmetrically conducting layers in parallel.

The rectifier plates 10 are assembled in two stacks. Both stacks are identical in construction, and one of these stacks is shown in detail in Figs. 2, 3 and 4. The rectifier stack is built up on four bolts 14, which are enclosed in insulating tubes or sleeves 15, and the plates 10 are assembled on these bolts, the bolts 14 passing through the holes 13 in the tabs 12 at one end of each plate 10. As shown in Fig. 4, each plate is supported on the two bolts 14 at one side of the stack, and its other end does not reach all the way to the other side, certain of the plates being supported on the bolts at one side of the stack and others of the plates being supported on the bolts at the other side.

The plates 10 are spaced apart by a plurality of insulating spacing washers 16 and conducting spacing washers 17, which may be made of metal, such as aluminum. The washers 16 and 17 fit over the bolts 14 to space the plates 10 apart and to clamp them in position, and the conducting washers 17 also serve to effect electrical connections, as described below. The insulating and conducting washers 16 and 17 on the bolts 14 at the right and left sides of the rear of the stack, respectively, are in the same relative positions as the washers on the bolts 14 at the front of the stack, shown in Fig. 4. The plates 10 are also spaced apart and supported by corrugated spacers 18 which also serve to make electrical connection to the oxide coatings of the plates. As shown in Fig. 5, each of the spacers 18 consists of two thin strips of copper 75, which are preferably silver-plated, and which are separated by a thin layer of insulating material 76. The spacers are corrugated so that one of the copper strips 75 contacts the coating of one adjacent rectifier plate and the other strip 75 contacts the coating of the other adjacent plate. The spacers 18 are relatively narrow and are disposed transversely of the direction of air flow so that they do not materially interfere with the flow of cooling air through the stack of plates.

The bolts 14 extend through aluminum channels 19 at the front and back of the stack, and the stack of plates is clamped between aluminum top and bottom plates 20 and 21 by means of nuts 22 threaded on the bolts 14 in the channels 19, the plates 20 and 21 being insulated from the stack of rectifier plates 10 by sheets 23 of insulating material, such as fish paper. The sides of the stack are closed by side plates 24 of insulating material which fit between the extending tabs 12 of the plates 10, and which may be riveted to flanges on the sides of the top and bottom plates 20 and 21, as indicated at 25.

The particular embodiment of the invention shown in the drawings is a three-phase rectifier, having forty-five plates 10 in each stack, connected in three electrically similar groups or arms, corresponding to the arms 1, 3, 5 or 2, 4, 6 of Fig. 1. Electrical connections to the groups of plates in each stack are made by means of copper terminal strips. Thus, at one side of the stack, terminal strips 26 to 34, inclusive, are inserted at appropriate places in the stack. These terminal strips are placed over the bolts 14 during assembly of the stack and extend along the side of the stack from front to back. One end of each terminal strip has an extending portion which extends on the outside of the side plate 24, as shown in Fig. 3. Similarly, terminal strips 35 to 43, inclusive, are placed at appropriate points in the other side of the stack in the same manner. The terminal strips 35 to 43 also extend from front to back of the stack and have extending portions at one end which extend outwardly from the stack, as shown in Fig. 2, at the diagonally opposite corner of the stack from the extending ends of the terminal strips 26 to 34.

The electrical connections of the plates 10 can readily be traced in Fig. 4, starting with the copper terminal strip 26, which is placed between the tabs 12 of the top rectifier plate 44 and the adjacent insulating washer 16, to make contact with the copper tabs of the plate 44. The oxide coatings of the top plate 44 are connected to the copper tabs of the second plate 45 by means of a clip 46 which is connected to the spacers 18 contacting the coatings on both sides of the plate, and copper straps 47 which are designed to limit the current to a safe value, and which extend between an insulating washer 16 at the left side of the stack and the tabs 12 of the plate 45. The oxide coatings of the plate 45 are connected to the copper tabs of the next plate 48 by means of the spacers 18 and copper clip 49, and an aluminum washer 17, which rests on the tabs of the plate 48. The coatings of the plate 48 are connected by means of spacers 18 and copper clip 50 and an aluminum spacing washer 17 to the terminal strip 35. Thus, the first three rectifier plates 44, 45 and 48 are connected in series between the terminals 26 and 35.

The oxide coatings of the next plate 51 are also connected to the terminal strip 35 by means of a clip 52, and the copper tabs 12 of the plate 51 are connected to the oxide coatings of the next plate 53 by means of an aluminum spacing washer 17 and a clip 54. The copper tabs 12 of the plate 53 are connected to the coatings of the next plate 55 by means of current limiting copper straps 56, and the copper tabs of the plate 55 are in contact with the terminal strip 27, so that the second three plates 51, 53 and 55, are in series between the terminals 35 and 27. Similarly, the remaining nine of the top fifteen rectifier plates of the stack, shown in Fig. 4, are connected in three more groups of three plates each between terminals at opposite sides of the stack. These connections can easily be traced in Figure 4, the connections between plates being effected by means of the current limiting straps 57, 58 and 59, and aluminum washers 17. All five groups of plates are connected in parallel by means of the aluminum washers 17 which contact the terminal strips.

In the particular embodiment of the invention shown in the drawings, each arm of the complete rectifier bridge circuit has five parallel branches with three plates 10 in series in each branch. Fig. 4, showing the top fifteen plates of one stack, shows one complete arm of the rectifier circuit, the plates being connected in five parallel branches of three series connected plates each, as explained above. The complete stack, as shown in Figs. 2 and 3, consists of forty-five plates 10 divided into three identical arms, each of which consists of a group of fifteen plates connected in the manner shown in Fig. 4, the successive groups of plates being insulated from each other by intervening washers 16. Thus, each stack of rectifier plates consists of a plurality of electrically similar groups of plates, each group of plates being connected to function as an arm of a rectifier bridge circuit. It will be understood, of course, that the number of parallel branches in each group of plates will be determined by the current to be carried and the area of the plates, and that more or less than three plates may be used in series in each parallel branch, depending on the voltage to be applied to the rectifier.

The complete rectifier assembly, which is shown in Figs. 7 and 8, consists of two stacks of rectifier plates 60 and 61, each of which is identical to the stack shown in detail in Figs. 2, 3 and 4. As shown in Fig. 7, the two stacks are preferably mounted in a suitable case or housing 62 of sheet metal, or other suitable material, which serves as a mechanical support for the stacks, and which also serves to direct the flow of air through the stacks, as indicated by the arrows. If desired, the case 62 may be extended to serve as a mounting means for other associated equipment, such as a motor-driven fan for cooling the rectifier.

The two stacks 60 and 61 which make up the complete rectifier assembly are inverted with respect to each other to facilitate the connections. Thus, as shown in Fig. 7, the stack 60 is in the same relative position as the stack shown in Figs. 2 and 3, while the stack 61, which is of identical construction, is inverted. The extending terminals 26 to 34 at one side of the stack 60, which contact the copper tabs 12 at one end of each of the three groups of plates 10 in the stack, are all connected together by a copper bus bar or other suitable conductor 63, which constitutes a direct-current output terminal of one polarity, and which may be connected to a direct-current output lead in any suitable manner. Similarly, the extending terminals 35 to 43 of the other stack 61, which contact the oxide coatings 11 of the plates 10 at one end of each of the three groups of plates in that stack, are all connected together by means of a copper bus bar 64, which constitutes the direct-current output terminal of opposite polarity, and which is adapted for connection to another direct-current output lead.

The remaining terminals of each stack are connected together in three groups, corresponding to the three rectifier arms in each stack. Thus, the terminals 35, 36 and 37 of the stack 60 are connected together in any suitable manner at 65 to form a terminal for the first arm in the stack. Similarly, the terminals 38, 39 and 40 of the stack 60 are connected together at 66, and the terminals 41, 42 and 43 are connected together at 67, to form terminals for the two other arms. In the same manner, the terminals 32, 33 and 34 of the stack 61 are connected together at 68, the terminals 29, 30 and 31 are connected together at 69 and the terminals 26, 27 and 28 are connected together at 70, forming terminals for the three rectifier arms of the stack 61. The corresponding terminals of the two stacks are connected together, as by bolts 71, to form the input terminals of the rectifier assembly, to which the three-phase alternating current input leads 72 are connected.

It will be seen by reference to Fig. 8 that this arrangement and connection of the rectifier plates 10 provides a rectifier assembly in which the plates are disposed in two stacks, each stack being divided into three electrically similar groups of plates which function as arms of a rectifier bridge circuit, all the arms in one stack being connected between the alternating current input leads and a direct current output lead of one polarity, and all the arms in the other stack being connected between the alternating-current input leads and a direct-current output lead of opposite polarity. As previously explained in connection with Fig. 1, this arrangement provides satisfactory operation even though the two stacks are in different ambient temperatures as the result of cooling them by a stream of cooling air which passes successively through the two stacks in series. There are no elements of the rectifier in one stack connected in parallel with elements in the other stack, and, therefore, there is no unequal division of current between different parts of the rectifier, since all parallel-connected elements of the rectifier operate at the same temperature. All the arms of the bridge circuit which are connected to a direct-current lead of one polarity are in one stack, and all those connected to a direct-current lead of opposite polarity are in the other stack, so that at any instant during the voltage cycle, an arm in one stack is carrying current in series with an arm in the other stack, and the forward voltage drop through the rectifier remains constant throughout the entire rectifying cycle, so that there is no objectionable ripple in the output current and voltage.

It should now be apparent that a rectifier assembly has been provided which is especially well adapted for aircraft rectifiers, where relatively large outputs are needed and where the space available is limited and the weight must be kept small. The new rectifier assembly permits the use of a relatively large number of small, extremely thin plates to obtain minimum weight and high efficiency, by assembling the plates in two stacks to fit into the limited space available, and by arranging and connecting them so as to obtain satisfactory operation with the stacks operating at somewhat different temperatures. This arrangement is particularly suitable for forced cooling, which is usually necessary for aircraft rectifiers, since the limited amount of cooling air available can flow through the two stacks in series without harmful effects on the operation of the rectifier from the resulting difference in temperature of the stacks. In the preferred embodiment of the invention, as shown on the drawing, the plates of each stack are spaced apart to permit the air to flow between the plates, and certain of the spacing means are utilized to effect electrical connections between the plates, thus making a simple and compact mechanical structure. The side plates 24 and the case 62, in which the stacks are mounted, direct the flow of air through the stacks in the desired manner, thus increasing the effectiveness of cooling.

It will be apparent that the invention is capable of various modifications and embodiments, and that any suitable mechanical construction of the rectifier stacks might be utilized. The invention has been described in connection with a three-phase rectifier, but similar problems are encountered in designing single-phase rectifiers of the bridge type and the invention is applicable to such rectifiers as well as to three-phase rectifiers. It is to be understood, therefore, that although a specific embodiment of the invention has been shown for the purpose of illustration, the invention is not limited to this particular embodiment, but in its broadest aspects it includes all equivalent constructions and modifications which come within the scope of the appended claims.

I claim as my invention:

1. A three-phase rectifier assembly of the dry plate type comprising a plurality of rectifier plates disposed in two stacks adapted to operate in different ambient temperatures, the plates of each stack being connected in three electrically similar groups adapted to function as arms of a rectifier bridge circuit, means for connecting one end of each group of plates in one of said stacks to a direct-current output lead of one polarity, means for connecting one end of each group of plates in the other of said stacks to a direct-current output lead of opposite polarity, means for connecting the remaining end of each group of plates in one stack to the remaining end of a group of plates in the other stack, and means for connecting said last-mentioned connecting means to three-phase alternating-current input leads.

2. A three-phase rectifier assembly of the dry plate type comprising a plurality of rectifier plates disposed in two stacks adapted to operate in different ambient temperatures, the plates of each stack being connected in three electrically similar groups adapted to function as arms of a rectifier bridge circuit, terminal means for each of said groups of plates, means for connecting together the terminal means at one end of each group of plates in one of said stacks of plates to form a direct-current output terminal of one polarity, means for connecting together the terminal means at one end of each group of plates in the other of said stacks of plates to form a direct-current output terminal of opposite polarity, and means for connecting the terminal means at the remaining end of each of the three groups of plates in one stack to the terminal means at the remaining end of a corresponding group of plates in the other stack, said last-mentioned connecting means forming three-phase alternating-current input terminal means.

3. A three-phase rectifier assembly of the dry plate type comprising a plurality of rectifier plates disposed in two stacks adapted to operate in different ambient temperatures, and means for connecting said rectifier plates in a three-phase rectifier bridge circuit having six arms, each arm of said bridge circuit being connected between an alternating-current input lead and a direct-current output lead, all of the rectifier plates in one of said stacks being included in three arms of the bridge circuit which are connected between alternating-current input leads and a direct-current output lead of one polarity, and all of the rectifier plates in the other of said stacks being included in three arms of the bridge circuit which are connected between alternating-current input leads and a direct-current output lead of opposite polarity.

4. A three-phase rectifier assembly of the dry plate type comprising a plurality of rectifier plates disposed in two stacks, spacing means between the plates of each stack for spacing the plates apart to permit the flow of cooling air therebetween, said two stacks of rectifier plates being disposed one behind the other so that cooling air flows through the two stacks successively, and means for connecting said rectifier plates in a three-phase rectifier bridge circuit having six arms, each arm of said bridge circuit being connected between an alternating-current input lead and a direct-current output lead, all of the rectifier plates in one of said stacks being included in three arms of the bridge circuit which are connected between alternating-current input leads and a direct-current output lead of one polarity, and all of the rectifier plates in the other of said stacks being included in three arms of the bridge circuit which are connected between alternating-current input leads and a direct-current output lead of opposite polarity.

5. A three-phase rectifier assembly of the dry plate type comprising a plurality of rectifier plates disposed in two stacks, spacing means between the plates of each stack for spacing the plates apart to permit the flow of cooling air therebetween, means at opposite sides of each stack of rectifier plates for confining and directing the flow of cooling air through the stack, said two stacks of plates being disposed one behind the other so that cooling air flows through the two stacks successively, means including certain of said spacing means for connecting the rectifier plates in each stack in three electrically similar groups adapted to function as arms of a three-phase rectifier bridge circuit, and means for connecting said groups of plates in a three-phase bridge circuit with each group connected between an alternating current input lead and a direct-current output lead, all of the rectifier plates in one of said stacks being included in three arms of the bridge circuit which are connected between alternating-current input leads and a direct-current output lead of one polarity, and all of the rectifier plates in the other of said stacks being included in three arms of the bridge circuit which are connected between alternating-current input leads and a direct-current output lead of opposite polarity.

HERMAN J. BRAUN.

REFERENCES CITED

The following references are of record in the file of this patent:

UNITED STATES PATENTS

| Number | Name | Date |
| --- | --- | --- |
| 1,959,513 | Weyandt | May 22, 1934 |
| 2,090,806 | Osawa | Aug. 24, 1937 |
| 2,221,576 | Dawson | Nov. 12, 1940 |

FOREIGN PATENTS

| Number | Country | Date |
| --- | --- | --- |
| 296,596 | British | Sept. 6, 1928 |
| 346,471 | British | Apr. 16, 1931 |